(12) United States Patent
Kisacanin

(10) Patent No.: US 7,423,540 B2
(45) Date of Patent: Sep. 9, 2008

(54) METHOD OF DETECTING VEHICLE-OPERATOR STATE

(75) Inventor: Branislav Kisacanin, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 137 days.

(21) Appl. No.: 11/317,431

(22) Filed: Dec. 23, 2005

(65) Prior Publication Data

US 2007/0159344 A1    Jul. 12, 2007

(51) Int. Cl.
    *G08B 23/00*    (2006.01)
(52) U.S. Cl. .................. 340/576; 340/937; 382/103; 382/118; 382/287; 382/296; 382/195
(58) Field of Classification Search .............. 340/576, 340/937
    See application file for complete search history.

(56) References Cited

U.S. PATENT DOCUMENTS

| | | | |
|---|---|---|---|
| 5,008,946 A * | 4/1991 | Ando | 382/104 |
| 5,729,619 A | 3/1998 | Puma | |
| 5,795,306 A | 8/1998 | Shimotani et al. | 600/558 |
| 5,818,954 A * | 10/1998 | Tomono et al. | 382/115 |
| 5,867,587 A | 2/1999 | Aboutalib et al. | |
| 6,049,747 A * | 4/2000 | Nakajima et al. | 701/45 |
| 6,130,617 A * | 10/2000 | Yeo | 340/575 |
| 6,154,559 A * | 11/2000 | Beardsley | 382/103 |
| 6,246,779 B1 * | 6/2001 | Fukui et al. | 382/103 |
| 6,496,117 B2 * | 12/2002 | Gutta et al. | 340/576 |
| 6,575,902 B1 | 6/2003 | Burton | |
| 6,661,345 B1 | 12/2003 | Bevan et al. | |
| 6,717,518 B1 | 4/2004 | Pirim et al. | |
| 6,718,050 B1 * | 4/2004 | Yamamoto | 382/117 |
| 6,859,144 B2 | 2/2005 | Newman et al. | |
| 6,927,694 B1 * | 8/2005 | Smith et al. | 340/576 |
| 7,020,305 B2 * | 3/2006 | Liu et al. | 382/107 |
| 7,027,621 B1 * | 4/2006 | Prokoski | 382/118 |

(Continued)

FOREIGN PATENT DOCUMENTS

EP          1336372          8/2003

(Continued)

OTHER PUBLICATIONS

Horprasert T et al: "Computing 3-D head sequence" Automatic Face and Gesture Recognition, 1996., Proceeding of the Second International Conference on Killington, VT, USA Oct. 14-16, 1996, Los Alamitos, CA, Oct. 14, 1996, pp. 242-247, XP010200427 ISBN: 0-8186-7713-9 *the whole document*.

*Primary Examiner*—George A Bugg
*Assistant Examiner*—Son M Tang
(74) *Attorney, Agent, or Firm*—Jimmy L. Funke

(57) ABSTRACT

A method of detecting the state of an operator of a vehicle utilizes a low-cost operator state detection system having no more than one camera located preferably in the vehicle and directed toward a driver. A processor of the detection system processes preferably three points of the facial feature of the driver to calculate head pose and thus determine driver state (i.e. distracted, drowsy, etc.). The head pose is generally a three dimensional vector that includes the two angular components of yaw and pitch, but preferably not roll. Preferably, an output signal of the processor is sent to a counter measure system to alert the driver and/or accentuate vehicle safety response.

4 Claims, 4 Drawing Sheets

U.S. PATENT DOCUMENTS

| | | | |
|---|---|---|---|
| 7,266,430 B2 * | 9/2007 | Basson et al. .................. | 701/1 |
| 2003/0039378 A1 * | 2/2003 | Yuasa et al. ................. | 382/104 |
| 2004/0044293 A1 | 3/2004 | Burton ...................... | 340/576 |
| 2004/0090334 A1 | 5/2004 | Zhang et al. | |
| 2004/0124985 A1 | 7/2004 | Young et al. | |
| 2004/0150514 A1 | 8/2004 | Newman et al. | |
| 2004/0151347 A1 * | 8/2004 | Wisniewski ................ | 382/115 |
| 2004/0233061 A1 | 11/2004 | Johns | |
| 2005/0024212 A1 | 2/2005 | Hultzsch | |
| 2005/0030184 A1 | 2/2005 | Victor | |

FOREIGN PATENT DOCUMENTS

| | | |
|---|---|---|
| WO | 2004/034905 | 4/2004 |

\* cited by examiner

METHOD OF DETECTING VEHICLE-OPERATOR STATE

TECHNICAL FIELD

The present invention relates to a method of detecting vehicle-operator state and more particularly to a method utilizing a video imaging system for measuring driver distraction, target awareness, drowsiness and fatigue.

BACKGROUND OF THE INVENTION

Vehicle accidents are known to occur when a driver becomes drowsy, distracted, or generally lacks awareness. In an attempt to anticipate driver drowsiness and/or distraction, known video monitoring systems include one or two cameras focused on the driver of the vehicle to capture images of the driver's facial characteristics which are indicative of the driver's state. Such facial characteristics include the position, orientation, and movement of the driver's head, eye position and gaze, and ocular data. By recognizing the driver's facial characteristics, vehicle control systems can provide enhanced vehicle functions and possibly reduce the risks of driver induced accidents.

For example, one such system is disclosed in U.S. Pat. No. 6,859,144, issued Feb. 22, 2005, assigned to the Assignee of the present invention and incorporated herein by reference in its entirety. In this system, a potential vehicle situation is determined by two video cameras sensing eye gaze direction of the driver and comparing this data with other data stored in memory of a system processor/controller. On the basis of this comparison, various automated vehicle alert actions can be taken. This system is limited to eye gaze and, unfortunately, other facial characteristics (e.g. head pose) that greatly contribute in determining driver state are essentially ignored. Yet further, to measure direction of eye gaze the processor algorithms require at least two cameras for reliable determination, which is costly.

Known head pose algorithms typically apply three angles representing deviations from a nominal pose. Two cameras have traditionally been required so that the three dimensional components of the head pose (or in this instance the eye gaze) can be reliably calculated from the stereo information about the eyes.

Another example of a driver state monitoring system is disclosed in U.S. Patent Application Publication 2004/0090334, filed Nov. 11, 2002, assigned to the Assignee of the present invention and incorporated herein by reference in its entirety. This system is relatively low cost because it requires only one camera. This system generally is capable of detecting only drowsiness and by only measuring a temporal percentage of eye closure. That is, the system does not measure any type of three-dimensional head pose (i.e. nodding of the head which is an indicator of drowsiness), and instead, relies upon a processor to determine a time proportion of eye closure versus non-closure and compares the time proportion against a pre-established threshold value.

SUMMARY OF THE INVENTION

A method of detecting the state of an operator of a vehicle utilizes a low-cost operator state detection system having no more than one camera located preferably in the vehicle and directed toward a driver. A processor of the detection system processes preferably three points of the facial feature of the driver to calculate head pose and thus determine driver state (i.e. distracted, drowsy, etc.). The head pose is generally a three dimensional vector that includes the two angular components of yaw and pitch, but preferably not roll. Preferably, an output signal of the processor is sent to a counter measure system to alert the driver and/or accentuate vehicle safety response.

The method for determining vehicle operator state generates a non-stereo video image from the camera and searches for facial features by the video processor. If the driver is recognized, the processor retrieves a facial profile from memory and the head pose is calculated and tracked. If not, preferably, the image of the new driver is calibrated and a facial profile is created and stored to memory before calculation of head pose.

Objects features and advantages of this invention include a method of detecting driver distraction and drowsiness utilizing a low-cost and compact system having only one camera capable of utilizing associated algorithms to recognize known drivers for improved response times and categorizing new drivers. Associated confidence levels of output data are repeatable, highly accurate, and the system required to support the method is relatively inexpensive, utilizes fewer components and in service has a long and useful life.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
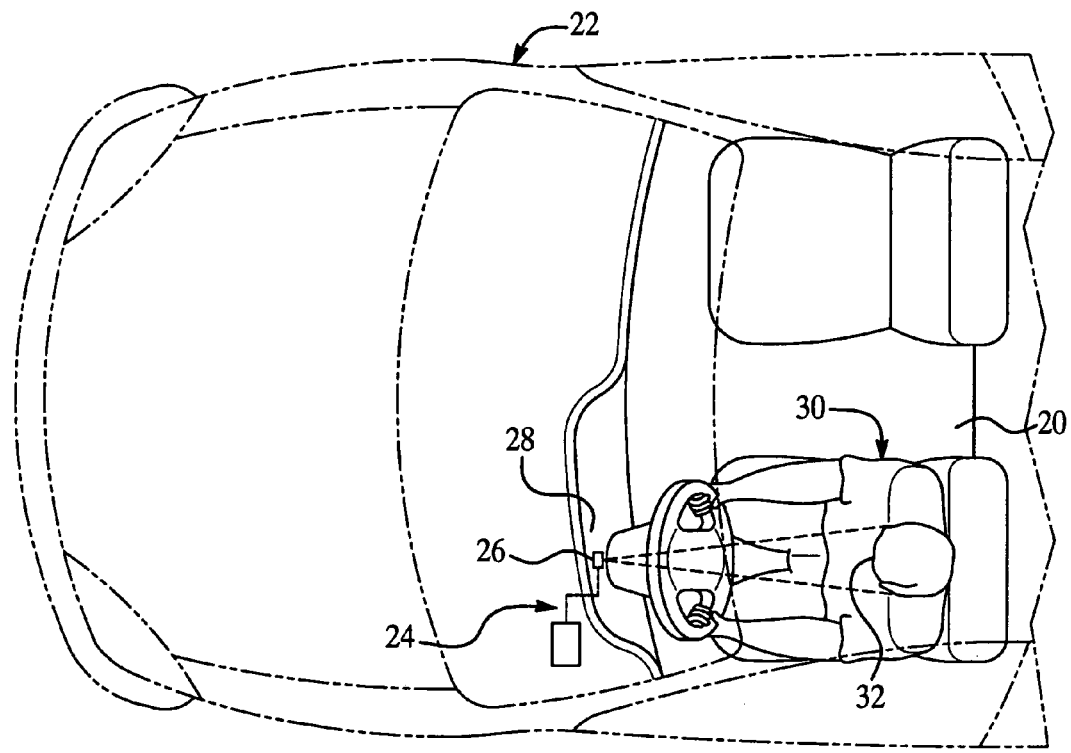
FIG. 1 is a top view of a video camera located in the cockpit of a vehicle having a single video camera and projecting towards the facial features of a driver utilized by the method of detecting vehicle-operator state embodied in the present invention.
Figure 2:
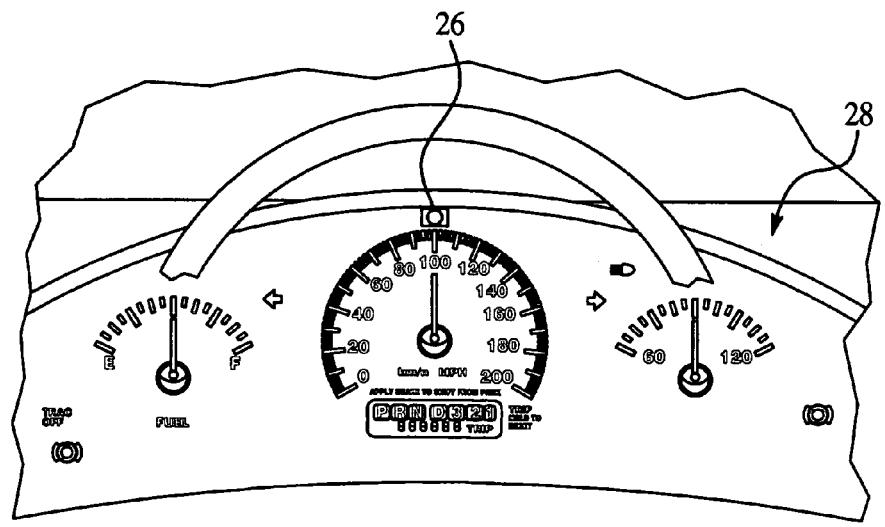
FIG. 2 is a front view of the video camera integrated into an instrument console of the vehicle.

Referring to FIGS. 1 and 2, an interior or compartment 20 of a vehicle 22 is generally shown equipped with a vehicle operator state detection system 24, which applies a method of detecting vehicle-operator state. Vehicle 22 has only one imaging sensor or video camera 26 located generally within an instrument panel, dash or console 28 of the vehicle 22 and preferably focused on an operator or driver 30. The video camera 26 is shown mounted generally in a mid-region of the dash 28 in front of the driver 30. Other locations for mounting the video camera 26 are possible provided the camera 26 is capable of focusing upon three distinctive points of the operator's facial features 32 at substantially all times. For example, the video camera 26 may be mounted in the steering assembly or may be mounted generally in the instrument cluster provided symmetry of the face is preserved thus limiting mounting choice freedom generally in a vertical direction, and as disclosed in U.S. application Ser. No. 10/103,202 filed in Mar. 21, 2002, the entire disclosure of which is hereby incorporated herein by reference.

Figure 5:
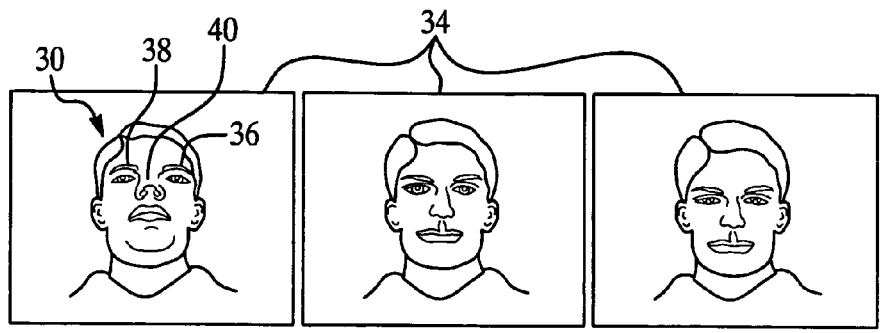
FIG. 5 is a series of illustrations depicting head pose pitch.
Figure 6:
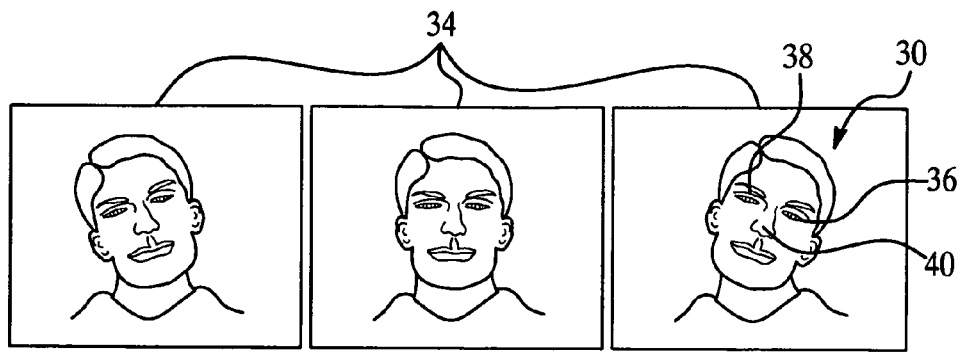
FIG. 6 is a series of illustrations depicting head pose roll, preferably an angular component not applied in the method embodied in the present invention.
Figure 7:
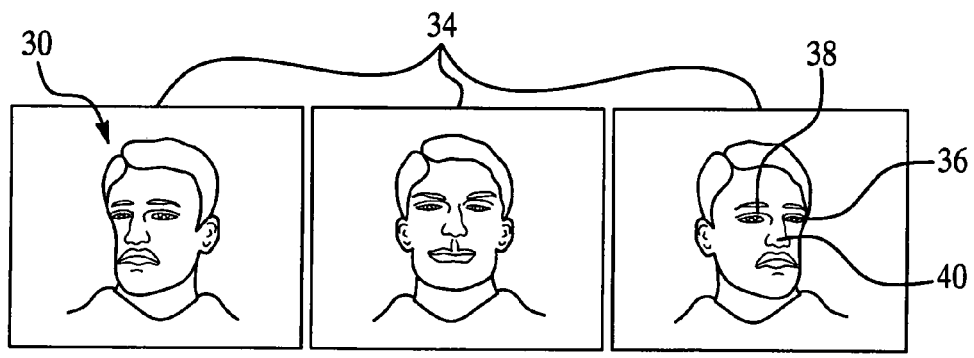
FIG. 7 is a series of illustrations depicting head pose yaw.

Referring to FIGS. 5-7, the video camera 26 is positioned on the dash 28 such that the camera captures successive video frames or images 34 of the region where the operator 30 of the vehicle 22 is expected to be located during normal vehicle driving. More particularly, the video camera 26 generally tracks the two angular component head pose of the operator 30, that indicates operator drowsiness, fatigue, distraction and the like. Head pose is generally a three-dimensional vector that describes angular deviations of a head pose vector from the frontal or reference pose vector and a horizontal plane. The known three angular components are typically referred to as yaw (head pose—left/right), pitch (head pose—up/down), and roll (head pose tilt). The present invention, however, does not utilize the angular component of tilt.

More specifically, the camera 26 captures three points 36, 38, 40 of the facial features 32 that are preferably the right eye 38, the left eye 36 and the nose 40, and the system 24 computes the two-dimensional spatial relationships between the three-points 36, 38 and 40. Changes in the two-dimensional spatial relationships when compared with pre-established system constraints can determine the two angular components of the head pose that translate into specific operator states (i.e. distracted, drowsy, etc.).

Figure 3:
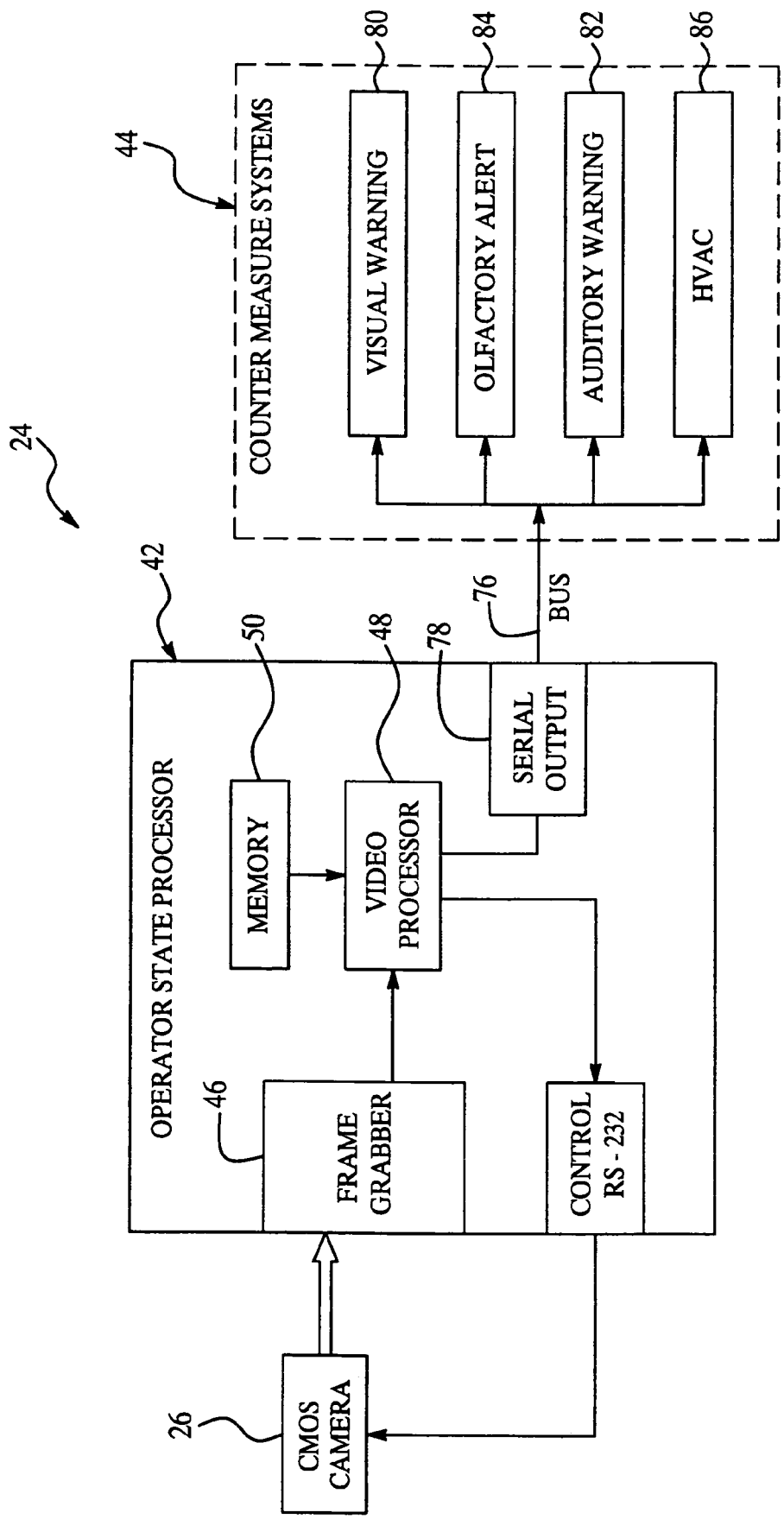
FIG. 3 is a block diagram illustrating operator state detection system integrated into counter measure systems.

Referring to FIG. 3, the operator state detection system 24 is further shown having the video camera 26 coupled to a operator state processor 42 that, in turn, is coupled to counter measure systems 44. The video camera 26 can include a CCD/CMOS active-pixel digital image sensor mounted as an individual chip onto a circuit board. One example of a CMOS active-pixel digital image sensor is Model No. PB-0330, commercially available from Photobit, which has a resolution of 640H×480V. It should be appreciated that other cameras, including less costly and less sophisticated video cameras, may be employed.

The operator state processor 42 is shown having a frame grabber 46 for receiving the video frames 34 generated by the video camera 26. The operator state processor 42 also includes a video processor 48 for processing the video frames 34. The processor 42 has a memory 50, such as random access memory (RAM), read-only memory (ROM), and other memory as should be readily apparent to those skilled in the art.

Known video imaging systems used to monitor driver distraction, awareness, drowsiness and fatigue, require at least two imaging cameras for measuring head pose 74, which is generally the configuration and position of the facial features 32. Head pose 74 is represented by three angles. By determining three-dimensional deviations from a reference or nominal pose of the driver's facial features the state of the driver 30 can be determined. This state (i.e. distracted, drowsy, intent to shift lanes, etc.) can be fed into a driver state monitor or counter measure systems 44 for further automated action by the vehicle 22 for enhanced vehicle functions.

For known systems, two or more cameras are typically required so that the three dimensional components can be reliably calculated from the stereo/spatial information about the face and/or facial features 32. The three-dimensional vector representing head pose describes angular deviations of the head pose vector from the frontal or reference pose vector and a horizontal plane. For known and costly two camera stereo imaging systems, providing three-dimensional measurements, the three angular components are yaw (head pose—left/right), pitch (head pose—up/down), and roll (head pose tilt). The preferred embodiment of the present invention utilizes only one camera and preferably utilizes only the two components of yaw and pitch. With use of only one camera, packaging complexity and cost are reduced.

Figure 4:
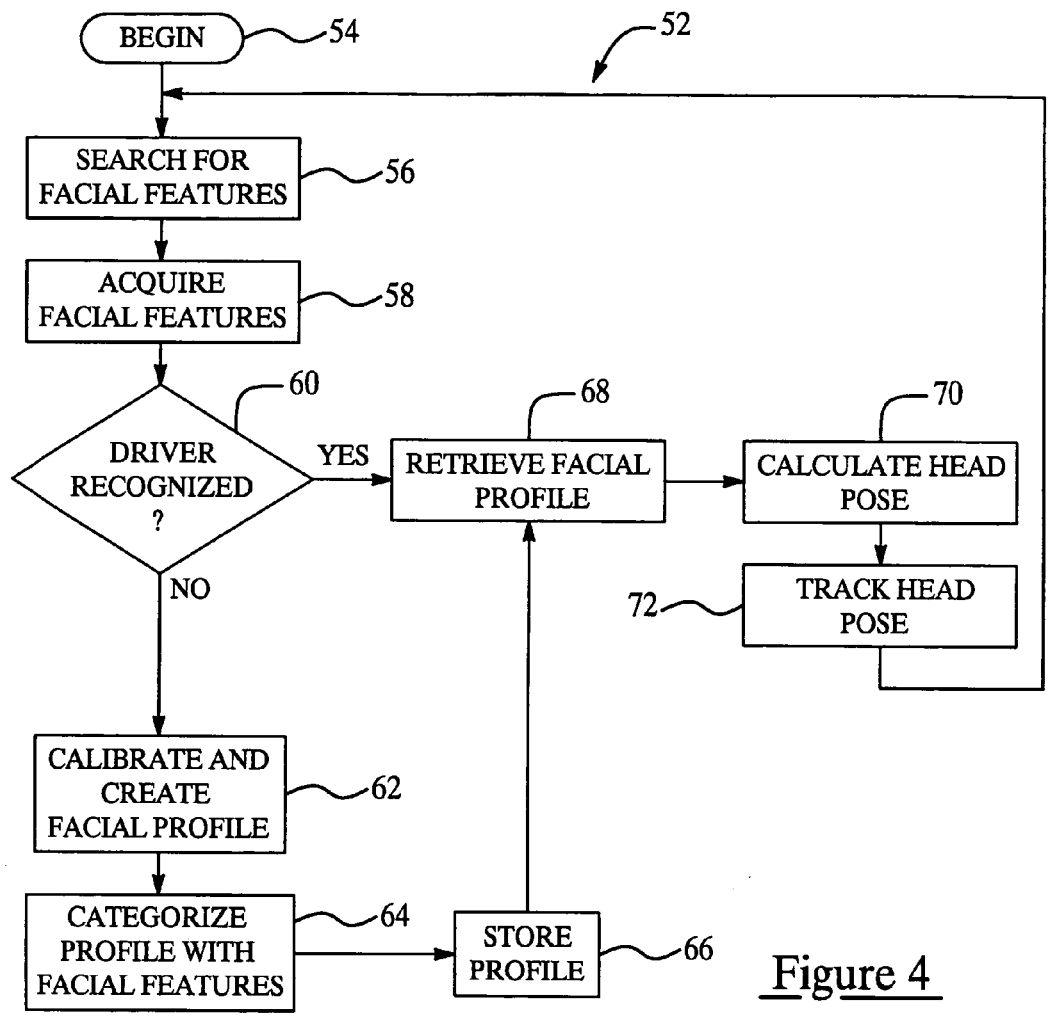
FIG. 4 is a flow diagram illustrating the method of detecting vehicle-operator state.

The operator state processor 42 is configured to at least perform one routine 52 for tracking and/or monitoring the facial features or profile 32 in the acquired video images 34 taken from the single camera 26. Referring to FIG. 4, the preferred driver monitoring routine 52 is illustrated. The monitoring routine begins at step 54 and proceeds to search for facial features in step 56. In step 58, the routine 52 acquires the facial features and, in decision step 60, determines if the driver 30 has been recognized. If the driver 30 has not been recognized from the acquired facial features, routine 52 will create a new facial profile in steps 62 through 66. This includes calibrating and creating a new facial profile in step 62, categorizing the profile with facial features in step 64, and storing the profile in memory 50 in step 66.

If either, the driver 30 has been recognized or a new profile 32 has been stored in memory 50, monitoring routine 52 will retrieve the facial profile in step 68. Thereafter, routine 52 calculates the head pose 74 (FIG. 8) in step 70. Calculation of the head pose 74 includes determination of vertical (V) and horizontal (H) components. Finally, the monitoring routine 52 proceeds to track the head pose in step 72, before returning to step 56.

Figure 8:
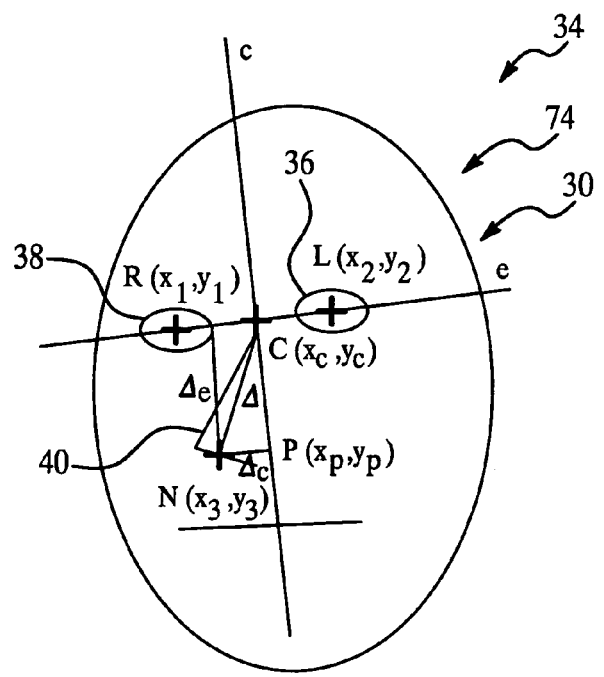
FIG. 8 is a frontal view of a three-vector head pose.

Referring to FIG. 8, the head pose 74 is generally determined by the location of R of the right eye 38, the location of L of the left eye 36 and the location of N of the nose 40 of the driver 30. The driver's right eye location R in the image 34 is given by $(x_1,y_1)$, the left eye location L, by $(x_2,y_2)$, and the nose location N by $(x_3,y_3)$. A Cyclop's point C is given by $(x_c, Y_c)$, where $$x_c = \frac{x_1 + x_2}{2} \text{ and } y_c = \frac{y_1 + y_2}{2}$$

The squared distance between the nose and the line (c) is considered, which passes through the Cyclop's point (C) and is perpendicular to the eye-line (e):

$$\Delta_c^2 = (x_3-x_p)^2 + (y_3-y_p)^2$$

where $P=(x_p,y_p)$ is the projection of the nose onto the line (c):

$$x_p = \frac{(y_c - y_3)(x_2 - x_1)(y_2 - y_1) + (x_2 - x_1)^2 x_c (y_2 - y_1)^2 x_3}{(x_2 - x_1)^2 + (y_2 - y_1)^2}$$

$$y_p = \frac{(x_c - x_3)(x_2 - x_1)(y_2 - y_1) + (y_2 - y_1)^2 y_c + (x_2 - x_1)^2 y_3}{(x_2 - x_1)^2 + (y_2 - y_1)^2}$$

The squared distance between the nose and the Cyclop's point is $$\Delta^2 = (x_3-x_c)^2 + (y_3-y_c)^2$$

hence the squared distance between the nose and the eye-line (e) is $$\Delta_e^2 = \Delta^2 - \Delta_c^2$$

Finally, the horizontal component (yaw) of the Head Pose is given by $$H = \pm \frac{A(x_2-x_1)^2}{(x_2-x_1)^2+(y_2-y_1)^2}\Delta_c^2$$

(see FIG. 7), while the vertical component (pitch, see FIG. 5) is $$V = \frac{A(x_2-x_1)^2}{(x_2-x_1)^2+(y_2-y_1)^2}\Delta_e^2 - V_0$$

Where (A) is a constant factor describing the geometry of the system, the sign of (H) is determined by the relative position of the nose and the line, as follows $$\text{sgn}(H) = \begin{cases} 1 & x_3 < x_p \\ & x_3 > x_p \\ -1 & \end{cases}$$

and ($V_0$) is the nominal (or reference) value of the vertical component (pitch), that needs to be determined through a statistical learning process, see FIG. 5.

The statistical learning of the nominal vertical head pose, ($V_0$), is based on the observation that under certain conditions, the nominal vertical head pose is also the most common vertical head pose.

The conditions for successful learning, under which the above observation is true, are

- The current ride started more than one minute ago, so that any excessive head motion common in the first seconds of a ride is removed.
- The driver 30 is not drowsy, as indicated by known AVECLOS (a process which generally measures duration of eye closure) or other drowsiness measures. This is needed because, otherwise, the most common vertical pose might not be the nominal vertical pose.
- The driver 30 is not distracted, as indicated by the horizontal component of the head pose 74, which should be close to nominal, otherwise the driver might be adjusting the radio and only occasionally glancing forward.

Therefore, the processor 48 observes the values of (V') given by $$V' = \frac{A(x_2-x_1)^2}{(x_2-x_1)^2+(y_2-y_1)^2}\Delta_e^2$$

over a period of a few minutes, rejects all data points for which the above conditions are not satisfied (i.e. driver is not drowsy or distracted), forms a histogram of values of (V') and finds the most common value of (V') (see FIG. 5). Denoting this common value as ($V_0$), the vertical component of the head pose is calculated as:

$V = V' - V_0$

With determination of the head pose 74 various thresholds can be pre-established and flagged through the operator state vision processor 42 as generally known in the art. Once flagged, the video processor 48 can output a signal 76 via serial output 78 based on the determination of the driver drowsiness and/or distraction so as to initiate action, such as to alert the driver of the drowsy condition and/or to initiate another counter measures. The signal 76 via serial output 78 may be supplied via communication bus to one or more counter measure systems 44. Counter measure systems 44 may include a visual warning system 80 that preferably has one or more LED lights, and/or an auditory warning system 82 that preferably has an audio message or alarm. The counter measure systems 44 may further include an olfactory alert system 84 that preferably includes delivering a scented gas (i.e. peppermint) in the vicinity of the driver 30, and nay also include the heating, ventilation, and air conditioning (HVAC) system 86 that controllably delivers fresh cooler air to the driver 30, in an attempt to increase driver alertness. Other counter measure systems may similarly be employed in response to receiving a driver drowsiness/distraction condition signal(s).

Although the preferred embodiment of the present has been disclosed, various changes and modifications can be made by one skilled in the art without departing from the scope and spirit of the invention as set forth in the appended claims. Furthermore, it is understood that the terms used here are merely descriptive rather than limiting and various changes may be made without departing from the scope and spirit of the invention.

The invention claimed is:

1. A method for determining vehicle operator state for alerting the operator and comprising the steps of:
    generating a non-stereo video image of said operator from a single camera, said image comprising a right eye, a left eye and a nose;
    acquiring a first point, a second point and a third point of said image by a video processor, wherein the first point corresponds to the right eye, the second point corresponds to the left eye and the third point corresponds to the nose;
    establishing a first line through the first and second points;
    determining a cyclop's point centered between the first and second points and lying on the first line;
    establishing a second line drawn through the cyclop's point and disposed perpendicular to the first line;
    calculating a shortest squared second distance between the third point and the second line;
    utilizing the second distance to calculate a horizontal component of a head pose by the video processor;
    calculating a shortest squared first distance between the third point and the first line; and
    utilizing the first distance to calculate a vertical component of the head pose.

2. The method for determining vehicle operator state set forth in claim 1 further comprising the steps of:
    determining a nominal vertical component through a statistical learning process; and
    utilizing the nominal vertical component to further calculate the vertical component of the head pose.

3. The method for determining vehicle operator state set forth in claim 2 wherein the nominal vertical component is generally the most common vertical component of the head pose.

4. The method for determining vehicle operator state set forth in claim 3 wherein the statistical learning process omits about the first minute of driving time to eliminate any excessive motion of the operator and the driver is assumed not to be drowsy or distracted.

* * * * *